United States Patent
Steinhauer et al.

(10) Patent No.: US 10,552,081 B1
(45) Date of Patent: Feb. 4, 2020

(54) MANAGING RECALL DELAYS WITHIN HIERARCHICAL STORAGE

(71) Applicant: International Business Machines Corporation, Armonk, NY (US)

(72) Inventors: Sabine U. Steinhauer, Kelsterbach (DE); Frank Mueller, Moerfelden-Walldorf (DE); Frank Lautenbach, Loerzweiler (DE); Dominic Mueller-Wicke, Weilburg (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/150,088

(22) Filed: Oct. 2, 2018

(51) Int. Cl.
*G06F 3/06* (2006.01)
*H04L 29/06* (2006.01)
*G06F 16/182* (2019.01)

(52) U.S. Cl.
CPC .......... *G06F 3/0647* (2013.01); *G06F 3/0611* (2013.01); *G06F 3/0653* (2013.01); *G06F 3/0685* (2013.01); *G06F 16/1827* (2019.01); *H04L 67/42* (2013.01)

(58) Field of Classification Search
CPC .... G06F 3/0647; G06F 3/0611; G06F 3/0653; G06F 3/0685; G06F 16/1827; H04L 67/42
See application file for complete search history.

(56) References Cited

U.S. PATENT DOCUMENTS

| | | | |
|---|---|---|---|
| 6,279,026 B1 * | 8/2001 | Clarke et al. | G06F 9/00 709/102 |
| 6,356,863 B1 * | 3/2002 | Sayle | G06F 9/455 703/27 |
| 6,549,934 B1 | 4/2003 | Peterson et al. | |
| 6,654,748 B1 * | 11/2003 | Rabung et al. | G06F 17/30 707/10 |
| 6,850,911 B1 * | 2/2005 | Huether | G06F 17/60 705/51 |
| 7,216,346 B2 * | 5/2007 | Bender et al. | G06F 9/46 718/102 |
| 7,873,817 B1 * | 1/2011 | Aloni et al. | G06F 9/46 712/235 |

(Continued)

FOREIGN PATENT DOCUMENTS

WO WO 2018115750 A1 * 6/2018 ........... H04L 67/322

OTHER PUBLICATIONS

Di Napoli et al, "Explicit Control of Service Execution to Support QoS-Based Grid Scheduling", 2008, International Conference on Algorithms and Architectures for Parallel Processing, Algorithms and Architectures for Parallel Processing, pp. 245-256 (Year: 2008).*

(Continued)

*Primary Examiner* — Tracy A Warren
(74) *Attorney, Agent, or Firm* — Zilka-Kotab, P.C.

(57) ABSTRACT

A computer-implemented method according to one embodiment includes identifying, at a client device, a request for data by an application of the client device, sending, from the client device to a first server, the request for the data, suspending a performance of actions on the data by the application of the client device, and presenting a status of a recall of the data to the application of the client device.

20 Claims, 6 Drawing Sheets

(56) References Cited

U.S. PATENT DOCUMENTS

| | | | |
|---|---|---|---|
| 9,596,291 B1* | 3/2017 | Basva | H04L 67/06 67/6 |
| 9,830,085 B1* | 11/2017 | Hasegawa et al. | G06F 3/0611 3/611 |
| 2002/0078133 A1* | 6/2002 | Nagano et al. | G06F 15/16 709/201 |
| 2005/0066095 A1* | 3/2005 | Mullick et al. | G06F 12/14 710/200 |
| 2006/0129558 A1* | 6/2006 | Brown et al. | G06F 17/30 707/10 |
| 2006/0212746 A1* | 9/2006 | Amegadzie et al. | G06F 11/00 714/6 |
| 2008/0155214 A1* | 6/2008 | Shitomi | G06F 12/16 711/162 |
| 2009/0245153 A1 | 10/2009 | Li et al. | |
| 2009/0300079 A1* | 12/2009 | Shitomi | G06F 12/02 707/204 |
| 2010/0076805 A1* | 3/2010 | Batsakis et al. | G06Q 30/00 705/8 |
| 2010/0095164 A1 | 4/2010 | Kamei et al. | |
| 2010/0332401 A1 | 12/2010 | Prahlad et al. | |
| 2012/0011176 A1* | 1/2012 | Aizman | G06F 17/30 707/822 |
| 2013/0151828 A1 | 6/2013 | Bello et al. | |
| 2015/0227316 A1* | 8/2015 | Warfield et al. | G06F 3/0608 3/608 |
| 2018/0059959 A1 | 3/2018 | Hasegawa et al. | |
| 2018/0357257 A1* | 12/2018 | Thompson et al. | G06F 17/30221 |

OTHER PUBLICATIONS

Shepler, S., Eisler, M. and D. Noveck, "Network File System (NFS) Verstion 4 Minor Version 1 Protocol," Internet Engineering Task Force (IETF), Jan. 2010.*

* cited by examiner

MANAGING RECALL DELAYS WITHIN HIERARCHICAL STORAGE

BACKGROUND

The present invention relates to recall of migrated data, and more specifically, this invention relates to managing recall delays within hierarchical storage.

Data tiering is a common solution that addresses the storage of large quantities of data. For example, data meeting predetermined criteria may be migrated from a first location at a first storage tier to a second location at a second storage tier. However, recalling migrated data may result in delayed data access, and this delay may result in unnecessary/redundant data requests for the data being migrated.

SUMMARY

A computer-implemented method according to one embodiment includes identifying, at a client device, a request for data by an application of the client device, sending, from the client device to a first server, the request for the data, suspending a performance of actions on the data by the application of the client device, and presenting a status of a recall of the data to the application of the client device.

According to another embodiment, a computer program product for managing recall delays within hierarchical storage includes a computer readable storage medium having program instructions embodied therewith, where the computer readable storage medium is not a transitory signal per se, and where the program instructions are executable by a processor to cause the processor to perform a method including identifying, by the processor at a client device, a request for data by an application of the client device, sending, by the processor from the client device to a first server, the request for the data, suspending, by the processor, a performance of actions on the data by the application of the client device, and presenting, by the processor, a status of a recall of the data to the application of the client device.

A computer-implemented method according to one embodiment includes receiving, at a first server, a request for data from a client device, determining that the data has been migrated from the first server to a second server separate from the first server, initiating a recall of the data from the second server to the first server, identifying recall information associated with the recall of the data, calculating a recall duration, based on the recall information, and sending the recall duration and the recall information from the first server to the client device.

Other aspects and embodiments of the present invention will become apparent from the following detailed description, which, when taken in conjunction with the drawings, illustrate by way of example the principles of the invention.

DETAILED DESCRIPTION

Figure 1:
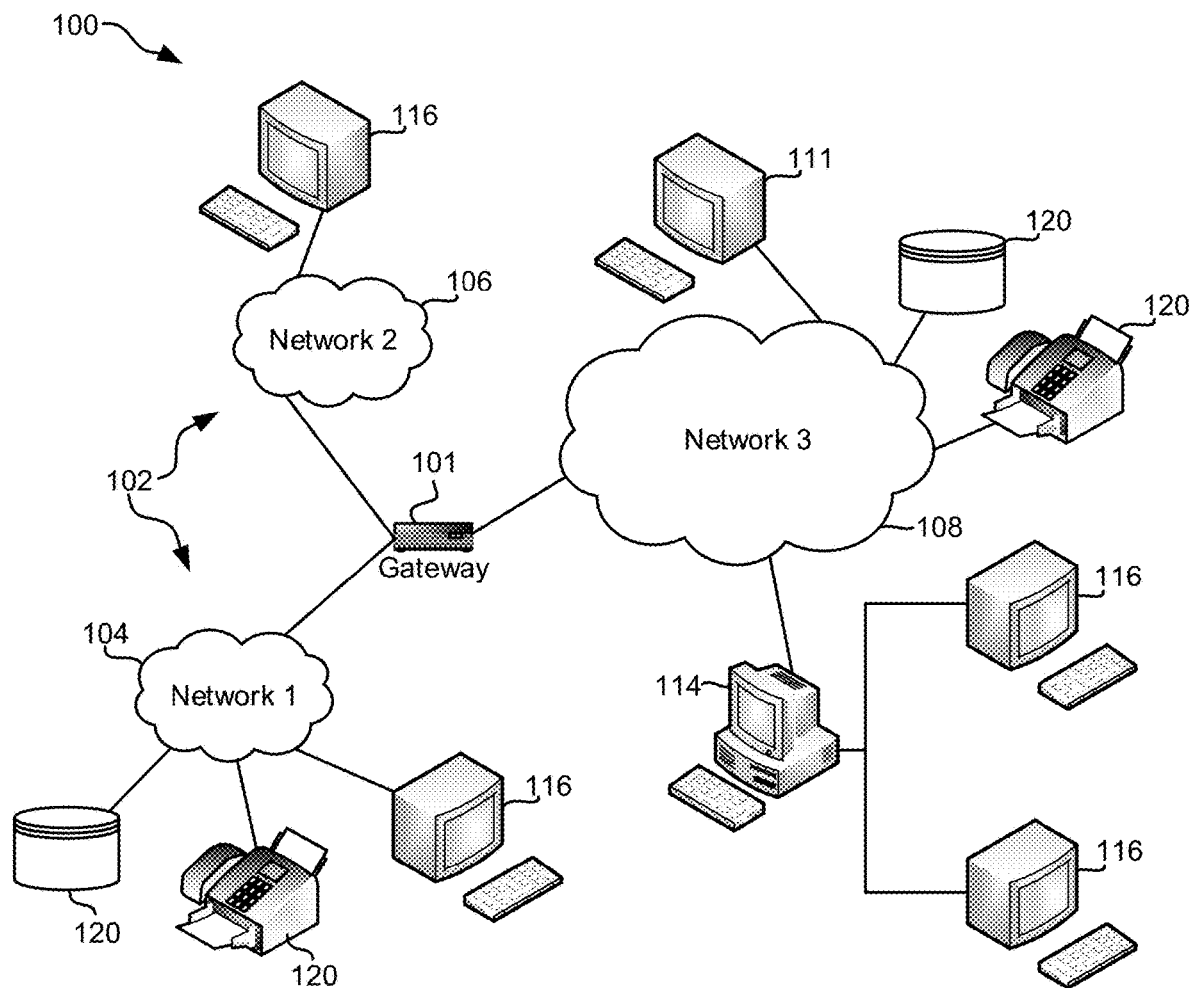
FIG. 1 illustrates a network architecture, in accordance with one embodiment.

The following description discloses several preferred embodiments of systems, methods and computer program products for managing recall delays within hierarchical storage. Various embodiments provide a method to calculate a recall duration based on received recall information, and route that recall information to a requesting application that has been temporarily suspended.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for managing recall delays within hierarchical storage.

In one general embodiment, a computer-implemented method includes identifying, at a client device, a request for data by an application of the client device, sending, from the client device to a first server, the request for the data, suspending a performance of actions on the data by the application of the client device, and presenting a status of a recall of the data to the application of the client device.

In another general embodiment, a computer program product for managing recall delays within hierarchical storage includes a computer readable storage medium having program instructions embodied therewith, where the computer readable storage medium is not a transitory signal per se, and where the program instructions are executable by a processor to cause the processor to perform a method including identifying, by the processor at a client device, a request for data by an application of the client device, sending, by the processor from the client device to a first server, the request for the data, suspending, by the processor, a performance of actions on the data by the application of the client device, and presenting, by the processor, a status of a recall of the data to the application of the client device.

In another general embodiment, a computer-implemented method includes receiving, at a first server, a request for data from a client device, determining that the data has been migrated from the first server to a second server separate from the first server, initiating a recall of the data from the second server to the first server, identifying recall information associated with the recall of the data, calculating a recall duration, based on the recall information, and sending the recall duration and the recall information from the first server to the client device.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
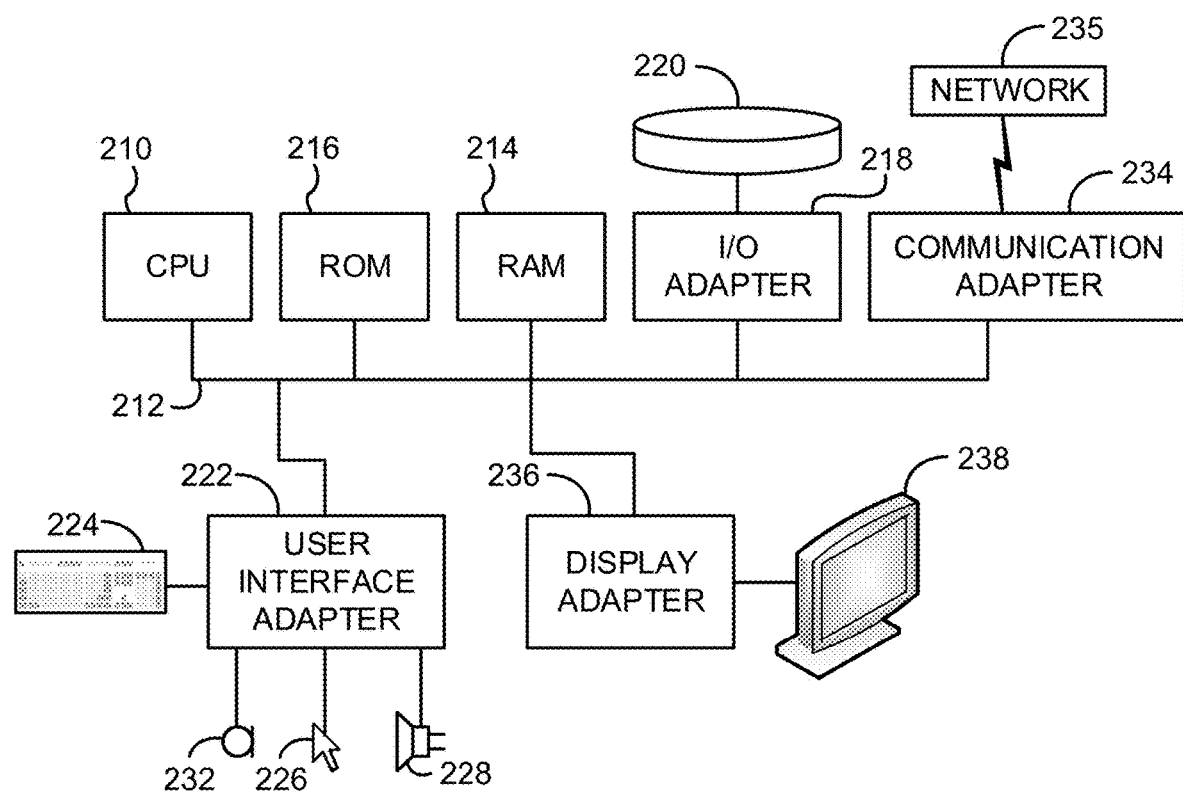
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
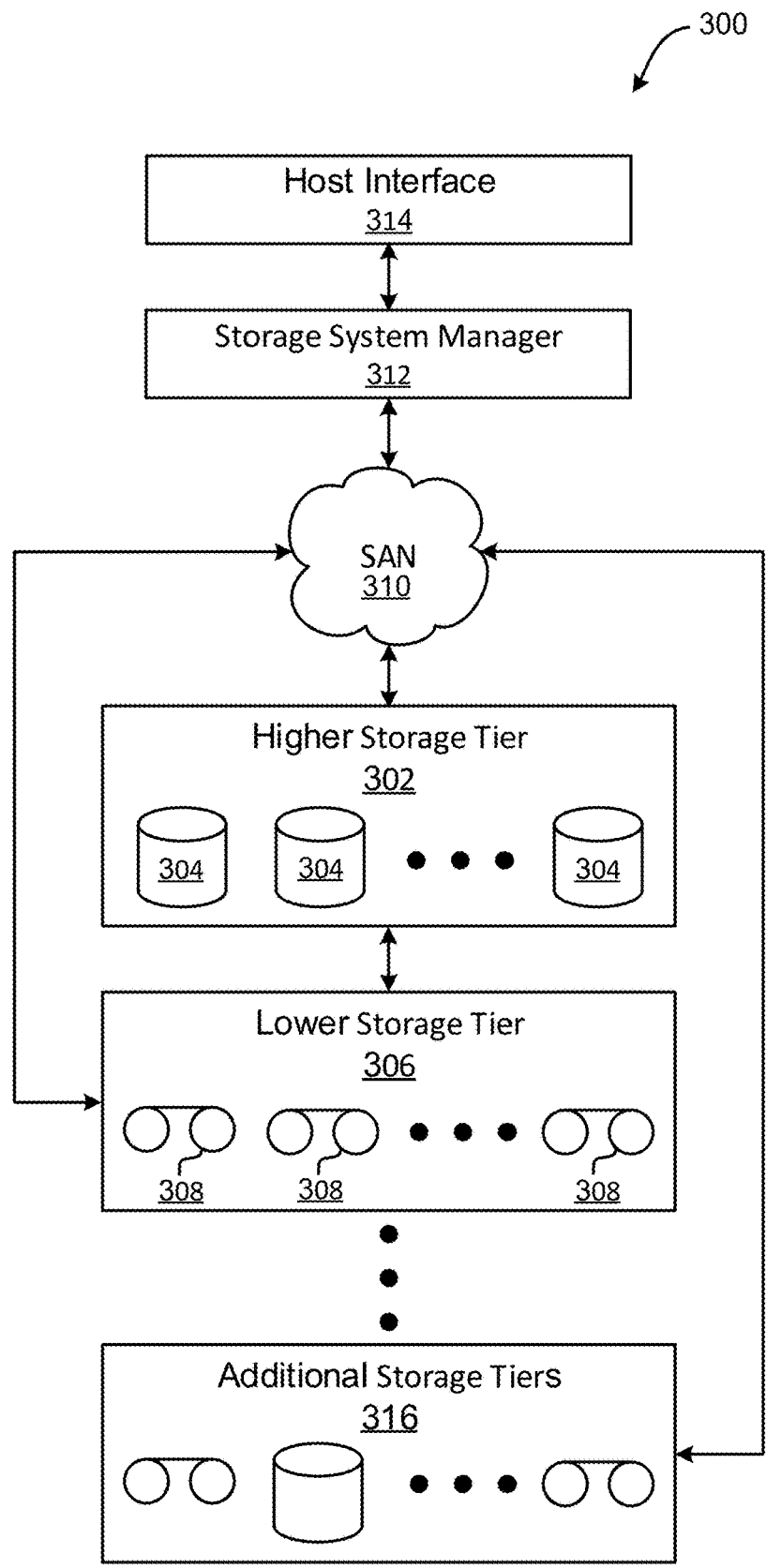
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
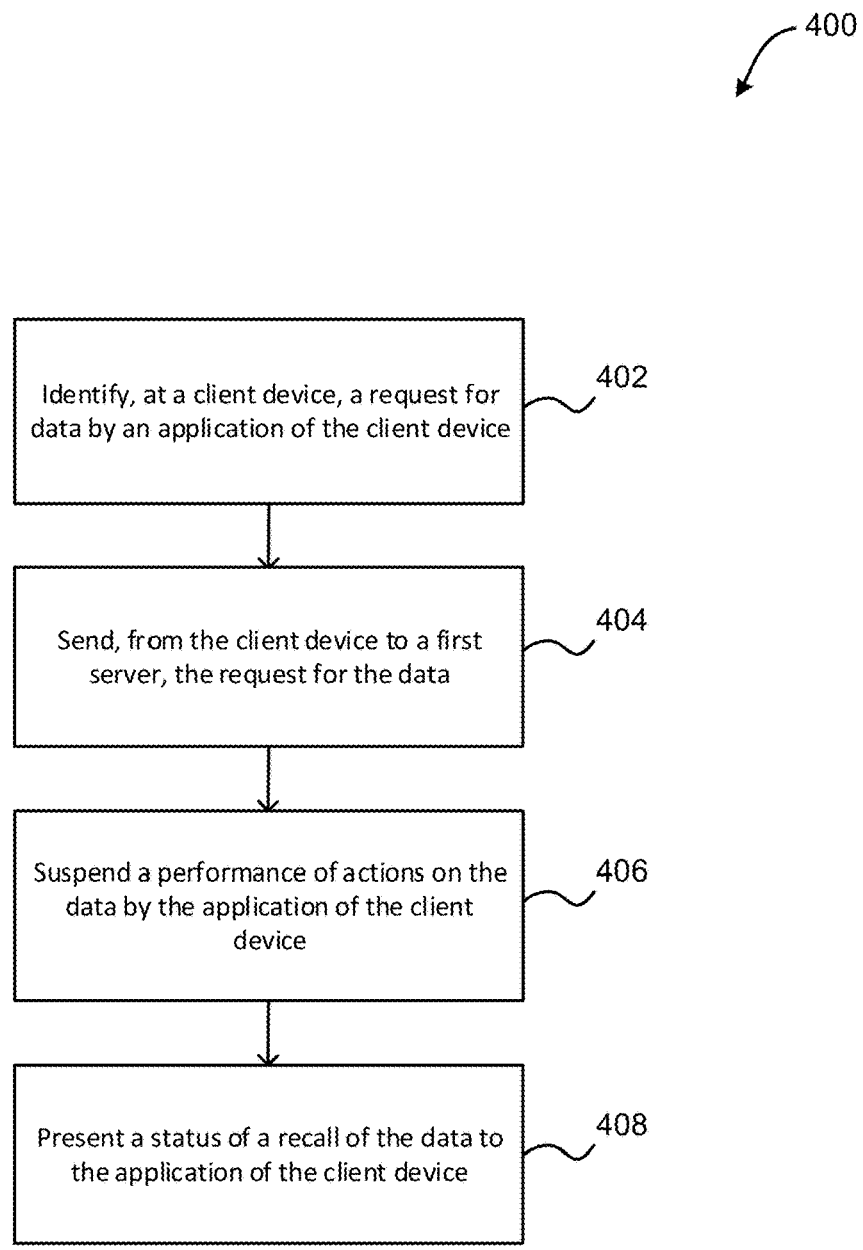
FIG. 4 illustrates a method for managing recall delays within hierarchical storage, in accordance with one embodiment.

Now referring to FIG. 4, a flowchart of a method 400 is shown according to one embodiment. The method 400 may be performed in accordance with the present invention in any of the environments depicted in FIGS. 1-3 and 6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request for data by an application of the client device is identified at the client device. In one embodiment, the data may include a file, object, etc. In another embodiment, the client device may include a mobile computing device, a desktop computing device, etc. In yet another embodiment, the client device may include a compute node of a distributed computing environment.

Additionally, in one embodiment, the application of the client device may include a user application that performs one or more actions utilizing the data. For example, the application may view the data, edit the data, analyze the data, etc. In another embodiment, the request for data may be identified by a network file system (NFS) client running within the client device. For example, the NFS client may receive the request for the data by the application. In another example, the NFS client may communicate with an NFS server running on a first server separate from the client device.

For instance, the NFS server may include a module at the first server that manages data requests for data. In another example, the first server may include a server computing device that includes one or more processors, RAM, one or more storage drives, etc. In another embodiment, the request for data may include a request to read the data (e.g., a read request), a request to write to/alter the data (e.g., a write request, etc.), etc. In yet another embodiment, the request may include an identifier of a specific file (e.g., a file handle, etc.).

Further, method 400 may proceed with operation 404, where the request for the data is sent from the client device to a first server. In one embodiment, it may be determined that the data is not currently stored at the client device. In another embodiment, in response to the determination, the NFS client at the client device may send the request for the data to the NFS server at the first server to retrieve the data from the first server.

Further still, method 400 may proceed with operation 406, where a performance of actions on the data by the application of the client device is suspended. In one embodiment, a notification may be received from the first server that the data is being recalled from a second server to the first server. For example, the notification may be received by the NFS client. In another example, the second server may include a Hierarchical Storage Management (HSM) server. In another embodiment, in response to receiving this notification, the NFS client on the client device may issue one or more operations (e.g., a SIGSTOP operation, etc.) to prevent the user application from performing further actions on the file.

Also, method 400 may proceed with operation 408, where a status of a recall of the data is presented to the application of the client device. In one embodiment, the data may be recalled to the first server from a second server separate from the first server, in response to the request. In another embodiment, the status of the recall of the data may include progress information received at the client device from the first server. For example, the NFS client at the client device may receive progress information from the NFS server at the first server.

In addition, in one embodiment, the progress information may be sent from the NFS server to the NFS client utilizing an updated communications protocol. For example, the NFS server may send the progress information to the NFS client in a message buffer of an NFS protocol error code. For instance, the NFS error code NFS4ERR_DELAY (or NFS3ERR_JUKEBOX) may be enhanced with a message buffer used to transport data between the NFS server and the NFS client. The progress information (including recall duration information) may be stored within this message buffer. In another example, the NFS error code NFS4ERR_MOVED contains a message buffer for inserting new location information. Instead of new location information, the progress information (including recall duration information) may be stored within this message buffer.

In another embodiment, the progress information may be added as metadata to the file. In yet another embodiment, the progress information includes a duration of the recall, a location within tiered storage where the data is located, a type of storage in which the data is located, a position of the data within tiered storage, etc.

Furthermore, in one embodiment, the NFS client may send the progress information to the application after receiving it from the NFS server. In another embodiment, the application may display the progress information to the user (e.g., utilizing a display of the client device, etc.). In still another embodiment, the progress information may be updated one or more times during recall of the file at the HSM server.

Further still, in one embodiment, a notification may be received from the first server that a recall of the data has been completed, and the data is currently stored at the first server. For example, the notification may be received by the NFS client from the NFS server. In another embodiment, in response to receiving the notification, the suspension of the performance of actions on the data by the application of the client device may be removed. For example, a SIGCONT operation may be sent from the NFS client to the application.

Also, in one embodiment, the requested data may then be sent to the application of the client device. For example, the NFS client may retrieve the requested data from the NFS server at the first server. In another example, the NFS client may then send the retrieved data to the application. In another embodiment, additional requests for the data may be received from an application, and the requested data may be retrieved from the first server and sent to the application.

In this way, the application of the client device may be notified as to a status of the recall of the data, including an estimated remaining time until the data is available to be accessed by the application. This may avoid unnecessary closure and/or restarting of the application, and may prevent additional requests for the data from being sent during the recall of the data, which may prevent overloading of the first server with requests for data currently being migrated. This may in turn improve a performance of the first server as well as a device running the application. Also, by preventing unnecessary/redundant requests from being sent to the first server for data currently being recalled, network traffic may be reduced between the first server and the device running the application, which may improve the performance of both the server and the device.

Figure 5:
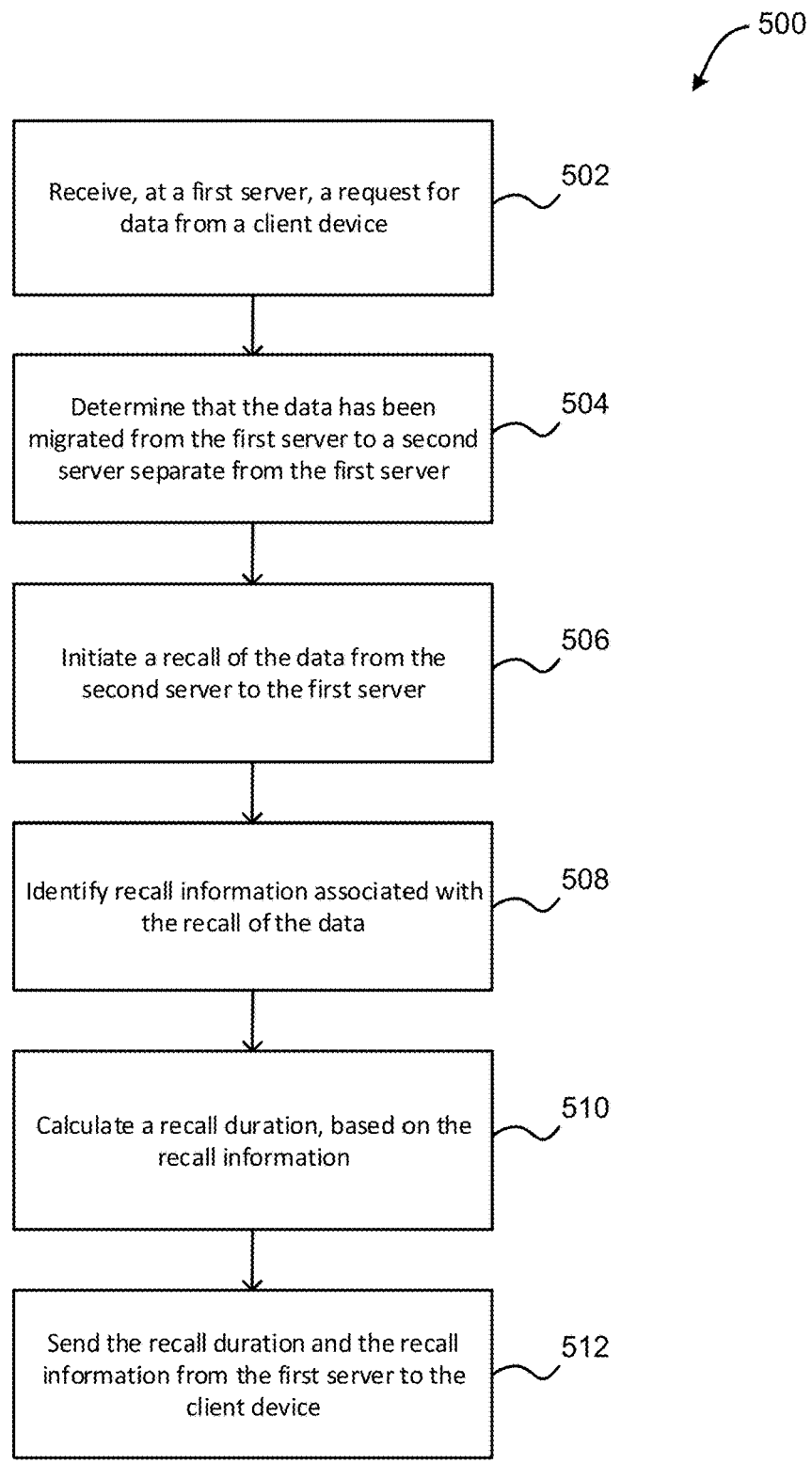
FIG. 5 illustrates a method for managing recall delays at a server side, in accordance with one embodiment.

Now referring to FIG. 5, a flowchart of a method 500 for managing recall delays at a server side is shown according to one embodiment. The method 500 may be performed in accordance with the present invention in any of the environments depicted in FIGS. 1-3 and 6, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5, method 500 may initiate with operation 502, where a request for data is received at a first server from a client device. In one embodiment, the request for the data may be sent from an application of the client device to an NFS client of the client device. In another embodiment, the request may then be forwarded from the NFS client of the client device to an NFS server at the first server. In yet another embodiment, the request for the data may include an identifier of a specific file (e.g., a file handle, etc.).

Additionally, method 500 may proceed with operation 504, where it is determined that the data has been migrated from the first server to a second server separate from the first server. In one embodiment, metadata associated with the data may be retrieved at the first server. In another embodiment, the metadata may be analyzed, and it may be determined that the data has been migrated in response to identifying that only a stub associated with the data (e.g., an HSM stub, etc.) is stored at the first server.

For example, the stub may indicate that the data has been migrated from the first server to a second server separate from the first server. In another example, the second server may utilize a different storage medium than the first server. In yet another example, the first server may utilize one or more hard disk drives to store data, and the second server may utilize one or more tape drives and cartridges to store data. In one embodiment, the first server may be located at a different storage tier than the second server. In another embodiment, the second server may include an HSM server.

Further, method 500 may proceed with operation 506, where a recall of the data from the second server to the first server is initiated. In one embodiment, the recall of the data may be initiated by sending a file recall request from the first server to the second server. For example, an NFS server within the first server may send a data recall request to an HSM client within the first server. In another embodiment, the HSM client may send the data recall request to an HSM server on the second server.

Further still, method 500 may proceed with operation 508, where recall information associated with the recall of the data is identified. In one embodiment, recall information associated with the recall of the data from the second server to the first server may be sent from the second server to the first server. In another embodiment, the recall information may include metadata describing a tier on which the data is located, a type of storage used to store the data at the tier (e.g., tape, hard disk drive, etc.), whether the storage is mounted, a position of the file within the storage, etc.

Also, method 500 may proceed with operation 510, where a recall duration is calculated, based on the recall information. In one embodiment, the recall duration may indicate an amount of time that the recall will take to complete. For example, the HSM client on the first server may calculate the recall duration, based on a comparison of the recall information to historic recall information associated with historical recall durations.

In addition, method 500 may proceed with operation 512, where the recall duration and the recall information are sent from the first server to the client device. In one embodiment, the recall duration and the recall information may be set as metadata for the file. In another embodiment, the recall duration and the recall information may be sent from the NFS server to the NFS client utilizing an updated communications protocol.

Furthermore, in one embodiment, during the recall, updated recall information may be received at the first server from the second server. For example, the updated recall information may include updates as to a progress of the recall of the data. In another embodiment, the recall duration may be re-calculated, based on the updated recall information. In yet another embodiment, the re-calculated recall duration and the updated recall information may be sent from the first server to the client device. For example, the re-calculated recall duration and the updated recall information may be set as metadata for the file.

Further still, in one embodiment, recall may be completed in response to the first server receiving the data from the second server. For example, the first server may store the data locally at the first server. In another embodiment, the first server may inform the client device that the recall is completed, and that the data is stored locally at the first server. In another embodiment, the first server may send one or more portions of the data to the client device.

In this way, information associated with the recall may be sent from the first server to the client device in order to prevent the client device from issuing additional unnecessary requests for the data to the first server, which may thereby improve a performance of the first server.

Overview

Enterprise IT (information technology) management involves the management of vast amounts of data. This data management includes classifying the data with respect to its availability for access in different time categories. Instantly required data may be stored in the main memory of a computer system, data required in milliseconds may be stored on disk storage systems and data not required within small amounts of time may be swapped out (e.g., to tape storage systems or other longer-term storage systems). Storage systems having such a tiered storage architecture (e.g., a disk system as a first storage tier and a long-term storage as second storage tier, etc.) may be denoted as hierarchical storage management (HSM) systems. Such HSM systems may represent a compromise between the data access time and the cost of storing large amounts of slowly changing data of data.

For a user, it may be completely transparent in an HSM system where a file may be stored (e.g., a first storage tier or a second storage tier, etc.). Typically, a stub file may be created in the file system if the original file is moved from the active storage system (e.g., from the first storage tier) to the second storage tier. For the user, a stub file is not differentiated from the original file because all metadata is shown (e.g., in a file explorer) as if it would be the original file, e.g., the file size. The file size may be shown as, e.g., 10 MB for a video file, although the related stub file may only require a couple of hundred bytes. Beside this, the HSM operations on the files (e.g., the time it takes to bring a file back from tape storage to disk storage) may be completely transparent for the user. This transparency may result in a file system hanging with no explanation as to the cause of the hang, which may result in undesired closure of the file system, multiple requests for data that is currently being recalled via the HSM system, etc.

In one embodiment, enhancements may be made to the NFS client module running on a first compute node and mounting the NFS file system, the NFS server running on a second compute node that holds the managed file system, the NFS protocol used for information exchange between NFS client and server and the HSM recall service running on the second node that holds the managed file system.

At the time the prior art console application accesses the migrated file in the NFS mounted file system it will be suspended from the NFS client. Then the read request will be send to the HSM recall service via the NFS server. The HSM recall service calculates the time it takes to recall the file. This information will be sent to the NFS client and the NFS client will write this information to the console of the suspended application. The information will be updated until the recall has finished. Then the console application will be resumed and can read the file.

In one embodiment, a system provides recall duration feedback to a console interface called Recall Feedback System (RFS), said system comprising:

An HSM recall service module used to recall the file data and to calculate recall duration information (RD), store said recall duration information as metadata on a file, recalculate and update the recall duration information until recall has finished An NFS server module used to export the file system and to read the recall duration metadata from a file and use the NFS protocol to transport this information to the NFS client module An NFS client module used to mount the NFS file system and suspend a user application and receive the recall duration information from the NFS server and write this information to the console interface An NFS protocol enhancement used to transport recall duration information (RD) between the novel NFS server and the novel NFS client Furthermore, a method is implemented that provides recall duration feedback to a console interface (called a Recall Feedback Method (RFM)).

Network File System

A network file system (NFS) is a distributed file system protocol that allows a user on a client computer to access files over a computer network much like local storage is accessed. NFS, like many other protocols, builds on the Open Network Computing Remote Procedure Call (ONC RPC) system. NFS is an open standard defined in Request for Comments (RFC), allowing anyone to implement the protocol. The protocol implements a wide range of operations and return/error codes used for various functions.

Figure 6:
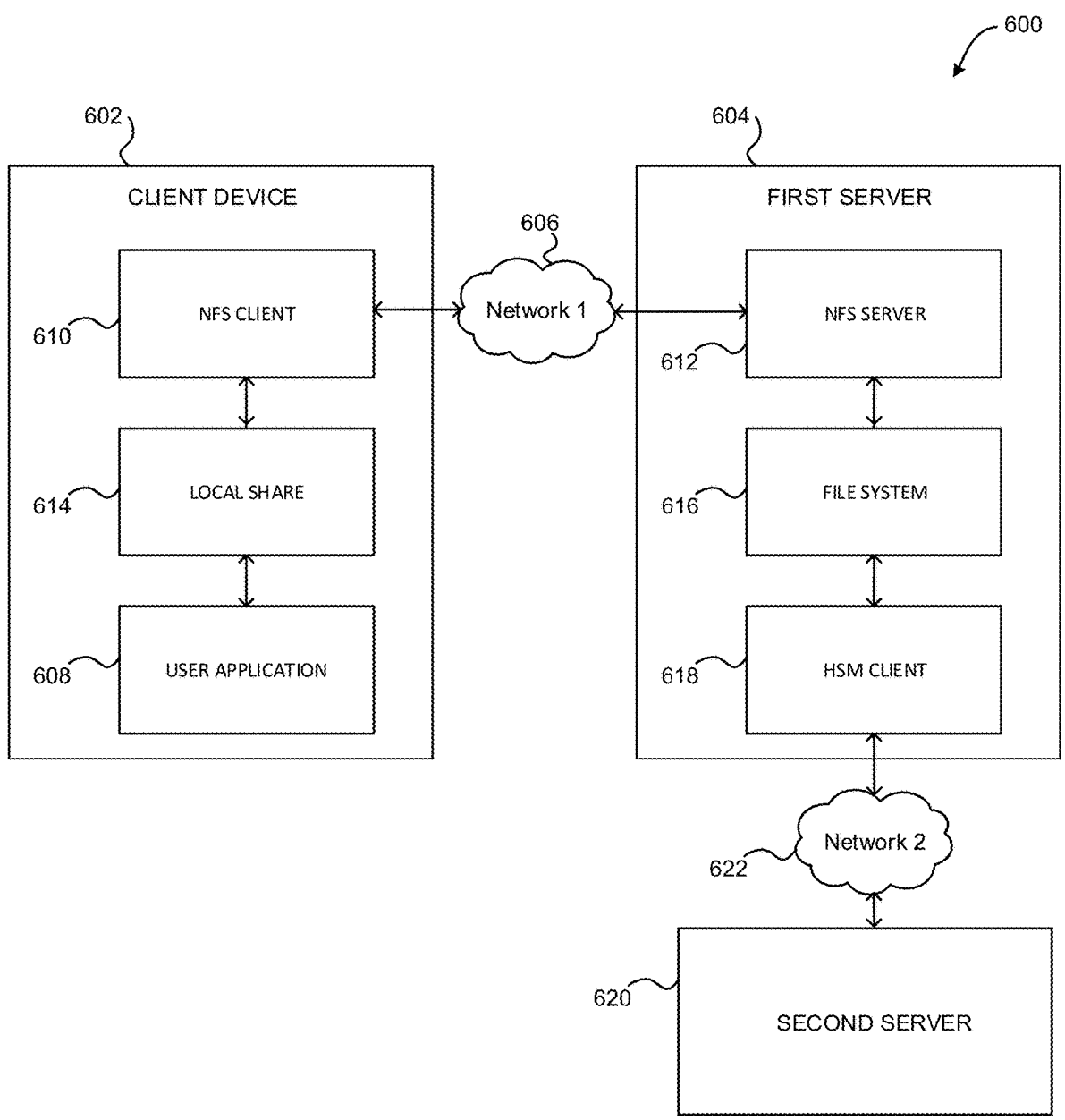
FIG. 6 illustrates an exemplary recall feedback environment, in accordance with one embodiment.

FIG. 6 illustrates an exemplary recall feedback environment 600, according to one exemplary embodiment. As shown, the environment 600 includes a client device 602 in communication with a first server 604 via a first network 606. In one embodiment, the client device 602 may include a compute node of a distributed computing environment. In another embodiment, the first server 604 may implement network file system (NFS) functionality within the client device 602. In another embodiment, the first network 606 may include a wired communications network and/or a wireless communications network.

Additionally, the client device 602 includes a user application 608 and an NFS client 610. The user application 608 may include any application that retrieves, manipulates, displays, or otherwise uses data. The NFS client 610 includes an application running within the client device 602 that communicates with an NFS server 612 located on the first server 604 in order to implement the NFS functionality within the client device 602. For example, the NFS client 610 may present data as being locally stored within the client device 602, when such data is actually stored within the first server 604 and is retrieved from the first server 604 to the client device 602 on demand.

Further, within the client device 602, the NFS client 610 presents the NFS shared file system to the user application 608 via a local NFS share 614. For example, the user application 608 may be directly connected to the local NFS share 614. Within the first server 604, a file system 616 is exported to the client device 602 utilizing the NFS, and the NFS exporting is processed by the NFS server 612.

Further still, hierarchical storage management (HSM) is implemented within the file system 616 of the first server 604. For example, the HSM client 618 within the first server 604 has direct access to the file system 616 of the first server 604, and performs tiering between data stored within the file system 616 and the second server 620 via the second network 622. In one embodiment, the second network 622 may include a wired communications network and/or a wireless communications network. In another embodiment, the second network 622 may be the same as the first network 606 or different from the first network 606. In still another embodiment, the second server 620 may include an HSM server.

For example, when a temperature of data within the file system 616 falls below a predetermined threshold, the HSM client 618 may move the data from the file system 616 to the second server 620, and may replace the removed data within the file system 616 with one or more stubs (e.g., HSM stubs) that indicate that the data has been migrated/tiered.

Recall Feedback Overview

In one embodiment, the user application 608 operates on a file in the local NFS share 614 (e.g. create, open, read, write, close, etc.). The NFS client 610 translates the file operation into an NFS operation and sends the information to the NFS server 612. The NFS server 612 translates the NFS operation into a file operation and starts the operation on the file in the file system 616.

Additionally, the HSM client 618 receives information about the file operation, and calculates the expected duration of the operation, which is sent to the NFS server 612 via file metadata. The NFS server 612 reads the file metadata and translates it into an NFS operation, which is sent to the NFS client 610. The NFS client 610 translates the NFS information into a user interface operation and informs the user application 608.

Further, the HSM client 618 performs required HSM operations on the file (e.g. recall), and the HSM client 618 communicates with the NFS server 612 (which in turn communicates with the NFS client 610) in a feedback loop that is repeated until the HSM processing has finished.

The HSM client 618 ends the HSM operation on the file, and the NFS server 612 ends the operation on the file and translates the result of the file operation into an NFS operation. The NFS server 612 sends the NFS operation information to the NFS client 610, and the NFS client 610 translates the NFS operation into a file operation and returns the file operation to the user application 608 via the local NFS share 614.

Server Implementation

In one embodiment, the NFS server 612 receives a read request from the NFS client 610. For example, the read request indicates data (e.g., a file, etc.) to be read. In another example, the read request includes a file handle (e.g., an ID of the file, etc.). In yet another example, the read request may include an NFS operation sent from the NFS client 610.

Additionally, in one embodiment, the NFS server 612 then retrieves file metadata for the file to be read. For example, the file metadata may be stored locally at the NFS server 612. In another embodiment, the NFS server 612 analyzes the file metadata, and the NFS server 612 determines that the file is an HSM stub. For example, the NFS server 612 determines that the file itself has been migrated to another storage tier and only the stub remains locally.

Further, in one embodiment, the NFS server 612 determines that the file is tiered, based on the HSM stub. In another embodiment, the NFS server 612 requests the file from the HSM client 618. For example, the request includes an identifier of the file. In yet another example, the HSM client 618 initiates a file recall request to the second server 620.

Further still, in one embodiment, the second server 620 initiates a file recall and sends recall information to the HSM client 618, in response to the file recall request. For example, the recall information includes metadata describing a tier on which the data is located, a type of storage used to store the data at the tier (e.g., tape, hard disk drive, etc.), whether the storage is mounted, a position of the file within the storage, etc.

Also, in one embodiment, the HSM client 618 calculates a recall duration, utilizing the recall information received from the second server 620. For example, the recall duration may be calculated by comparing the metadata received from the Second server 620 to historical information (e.g., historical time to mount a cartridge/drive, historical time taken to obtain data from a similar location within similar storage, etc.), where the historical information is associated with one or more historical recall durations.

In another example, the HSM client 618 may also identify a current network performance metric (e.g., a currently available network throughput, etc.) and use that performance metric to calculate the recall duration. For instance, the HSM client 618 may send a system call to ask for a current network/data transaction speed, a current network status, etc. In yet another example, the network performance metric may be associated with the first network 606 and/or the second network 622.

In addition, in one embodiment, the HSM client 618 sets the recall duration and recall info as recall metadata for the file. For example, the recall metadata may be sent to the NFS server 612. In another embodiment, the NFS server 612 reads the recall metadata. In yet another embodiment, the NFS server 612 sends progress information to the NFS client 610. For example, the progress information may be sent utilizing an updated communications protocol between the NFS server 612 and the NFS client 610. In another example, the progress information includes the recall duration, data tier location, type of storage, position of file, etc.

Furthermore, in one embodiment, during the recall, the second server 620 sends updated recall information to the HSM client 618. For example, the HSM client 618 calculates an updated recall duration, utilizing the updated recall information. In another example, the HSM client 618 sets the updated recall duration and the updated recall information as updated recall metadata for the file. In yet another example, the NFS server 612 calculates a time interval until a next read, based on the initial recall duration, and reads the updated recall metadata after the time interval has passed. The NFS server 612 then sends updated progress information to the NFS client 610, utilizing the updated communications protocol.

Further still, in one embodiment, the second server 620 completes all recall actions and obtains the file data. For example, the second server 620 obtains the file data at the second server 620, where the file data includes the data that constitutes the file itself. In another embodiment, the second server 620 sends the file data to the HSM client 618.

Also, in one embodiment, the HSM client 618 writes the file data to the file locally. For example, the HSM client 618 stores the file content locally (e.g., within a file system 616 at the first server 604 containing the HSM client 618, etc.) and links the file stub to the file content. In another embodiment, the HSM client 618 informs the NFS server 612 that the recall is completed and that the file data is stored locally.

Additionally, in one embodiment, the NFS server 612 informs the NFS client 610 that the recall is completed. In another embodiment, the NFS server 612 provides the file data to the NFS client 610. For example, the NFS server 612 sends the file data from the file system 616 at the first server 604 to the local NFS share 614 at the client. In yet another embodiment, future read requests for the file data are provided locally by the NFS server 612 (since the file data is now stored locally).

In another example, a copy console utility (e.g. the 'cp' Unix command) is invoked by a user on a console window. The copy command becomes a child process of the process running the console window (e.g., a 'console process,' etc.). The copy command attempts to access a file located on a remote server; however, this is transparent to the copy command process, it just attempts to open a file assumed to be local.

The file open request is handled by the NFS client 610 which leverages the expanded NFS protocol to forward the request to the first server 604 where the file is located. When the copy command opens the file in order to read its content the NFS client 610 first verifies if the file in fact exists on the first server 604. It then provides a handle to the file back to the copy process which is being used for all subsequent file operations like reading the actual data from the file.

On the first read attempt the NFS client 610 is informed by the first server 604 that the actual file data first needs to be recalled from an archive before it is accessible. The NFS client 610's data request also induces the first server 604 to start the recall process. The HSM client 618 calculates an estimated time of completion of the recall process and reports it back to the NFS client 610. Since the data requested by the copy command process is not instantaneously available the NFS client 610 induces the copy command process to be suspended by sending a SIGSTOP signal.

The NFS client 610 then sends direct messages to a console process which are then printed to a console window visible to the user. The messages regularly inform the user about the status and progress of the recall process. Once the file is completely recalled, the NFS client 610 writes to an application console with a console write command and resumes the copy command process by sending a SIGCONT signal. The resumed copy process is now served with the requested data from the recalled file. Once the data is read to completion, the file is closed, and the copy process finishes.

Client Implementation

In one embodiment, the NFS client 610 receives a file open request from a user application 608. For example, the file open request may include a request to open a file that is located at the remote server. In another embodiment, the NFS client 610 then verifies that the file exists on the remote server, and the NFS client 610 sends a file handle (e.g., a file identifier, etc.) to the user application 608. For example, the file handle may be used during communications between the user application 608, the NFS client 610, and the NFS server 612 to identify the file associated with various commands.

Additionally, in one embodiment, the file handle may be used during communications between the user application 608, the NFS client 610, and the NFS server 612 to identify the file associated with various commands. For example, the read request includes the file handle. In another example, the NFS client may also perform a file operation in the local NFS share 614 (e.g., by performing one or more of a create request, an open request, a read request, a write request, a close request, etc.).

Further, in one embodiment, the NFS client 610 then sends the read request to the NFS server 612. For example, the NFS client 610 may translate the file operation into an NFS operation, and may send the NFS operation to the NFS server 612. This initiates the file recall process on the first server 604.

Further still, in one embodiment, the NFS client 610 then sends a SIGSTOP operation to the user application 608. For example, this operation suspends the user application 608 from performing additional actions on the file. In another embodiment, the NFS client 610 receives progress information from the NFS server 612. For example, the progress information may be sent utilizing an updated communications protocol between the NFS server 612 and the NFS client 610. In another example, the progress information includes the recall duration, data tier location, type of storage, position of file, etc. In yet another example, the progress information may be updated one or more times during recall of the file at the second server 620.

Also, in one embodiment, the NFS client 610 then sends the progress information to the user application 608. In another embodiment, the user application 608 displays the progress information to the user (e.g., utilizing a display of the client device 602, etc.). In this way, the user may be informed of the status/progress of the file recall being performed.

In addition, in one embodiment, the NFS client 610 is then informed by the NFS server 612 that the recall is completed and the data is stored at the NFS server 612. In another embodiment, the NFS client 610 then sends a SIGCONT operation to the user application 608. For example, this operation removes the SIGSTOP suspension of the user application 608, and enables the user application 608 to perform additional actions on the file.

Furthermore, in one embodiment, the NFS client 610 then sends the file data to the local NFS share 614 accessible by the user application 608. For example, the file data may be sent in response to the initial read request from the user application 608 to the NFS client 610. In another embodiment, the user application 608 sends additional read requests for additional file data to the NFS client 610. For example, the initial read request may include a read request for a first portion of the file, and the additional read requests may include read request for additional portions of the file other than the first portion. In another example, the additional read requests may each include the file handle.

Further still, in one embodiment, the NFS client 610 sends additional portions of the file to the local NFS share 614 accessible by the user application 608, in response to the additional read requests. These additional portions are sent without delay since the file is now recalled and locally stored at the remote server device. In another embodiment, the user application 608 sends a file close request to the NFS client 610, where the file close request includes the file handle. The file is then closed utilizing the NFS client 610 and the NFS server 612.

In another example, the NFS client 610 sends the read request through the network to the NFS server 612. The NFS server 612 determines that the file is an HSM stub file and calls the HSM client 618. The HSM client 618 reads the stub file information and connects to the second server 620 and initiates the file recall. The second server 620 sends information about the file recall such as storage device type to the HSM client 618.

The HSM client 618 calculates the duration of the recall (RD) by summing the following values: a tape mount time, a tape spool time, and the higher number of: the data read on tape time and data transfer over network time. The HSM client 618 calculates the current state of the recall activity represented by the values "TAPE_MOUNT", "TAPE_SPOOL" or "DATA_TRANSFER."

The HSM client 618 writes the calculated RD and the current state (CS) in the metadata of the file. The NFS server 612 reads the RD from the file's metadata. The NFS server 612 writes the RD and the current state (CS) in a message buffer of the NFS protocol error code and sends the error code and message buffer to the NFS client 610.

The NFS client 610 processes the error information. The NFS server 612 receives an update request from the NFS client 610. The NFS server 612 sends an update request to the HSM client 618. The HSM client 618 re-calculates the recall duration (RD) and Current State (CS) and writes the information in the metadata of the file.

The above update processes are repeated n times until the file content is restored in the file. The NFS server 612 repeats the reading the RD and CS from the metadata of the file, and the writing of the RD and CS information in the message block of the NFS protocol error code, until the file content is restored.

After the file content is recalled the HSM client 618 completes the recall request. The user application 608 then performs one or more actions associated with the recalled file.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    identifying, at a client device, a request for data by an application of the client device;
    sending, from the client device to a first server, the request for the data;
    suspending a performance of actions on the data by the application of the client device;
    receiving progress information for a recall of the data via a message buffer of a network file system (NFS) protocol error code; and
    presenting the progress information to the application of the client device.

2. The computer-implemented method of claim 1, wherein the request for data is identified by a network file system (NFS) client running within the client device.

3. The computer-implemented method of claim 1, further comprising:
    receiving a first notification from the first server that the data is being recalled from a second server to the first server, the second server including hierarchical storage management (HSM) server; and
    receiving a second notification from the first server that the recall of the data has been completed and the data is currently stored at the first server; and
    removing the suspension of the performance of actions on the data by the application of the client device in response to receiving the second notification, including sending a SIGCONT operation from the client device to application of the client device;
    wherein suspending the performance of actions on the data is performed in response to receiving the first notification, and includes issuing a SIGSTOP operation to prevent the application from performing further actions on the data.

4. The computer-implemented method of claim 1, wherein in response to determining that the data is not currently stored at the client device, an NFS client at the client device sends the request for the data to an NFS server at the first server to retrieve the data from the first server.

5. The computer-implemented method of claim 1, wherein in response to receiving a notification from the first server that the data is being recalled from a second server to the first server, an NFS client on the client device issues a SIGSTOP operation to prevent the application from performing further actions on the data.

6. The computer-implemented method of claim 1, wherein the NFS protocol error code is a NFS4ERR DELAY that is enhanced to include the message buffer.

7. The computer-implemented method of claim 1, wherein progress information is sent from an NFS server to an NFS client utilizing an updated communications protocol.

8. The computer-implemented method of claim 1, wherein progress information is added as metadata to the data.

9. The computer-implemented method of claim 1, wherein progress information added as metadata to the data includes a duration of the recall, a location within tiered storage where the data is located, a type of storage in which the data is located, and a position of the data within tiered storage.

10. The computer-implemented method of claim 1, wherein progress information added as metadata to the data is updated one or more times during the recall of the data.

11. The computer-implemented method of claim 1, further comprising receiving a notification from the first server that a recall of the data has been completed, and the data is currently stored at the first server.

12. The computer-implemented method of claim 11, further comprising removing a suspension of the performance of actions on the data by the application of the client device, in response to receiving the notification.

13. The computer-implemented method of claim 11, further comprising sending the data to the application of the client device.

14. A computer program product for managing recall delays within hierarchical storage, the computer program product comprising a computer readable storage medium having program instructions embodied therewith, wherein the computer readable storage medium is not a transitory signal per se, the program instructions executable by a processor to cause the processor to perform a method comprising:
- identifying, by the processor at a client device, a request for data by an application of the client device;
- sending, by the processor from the client device to a first server, the request for the data;
- suspending, by the processor, a performance of actions on the data by the application of the client device;
- receiving, by the processor, progress information for a recall of the data via a message buffer of a network file system (NFS) protocol error code; and
- presenting, by the processor, the progress information a status of a recall of the data to the application of the client device.

15. A computer-implemented method, comprising:
- receiving, at a first server, a request for data from a client device;
- determining that the data has been migrated from the first server to a second server separate from the first server;
- initiating a recall of the data from the second server to the first server;
- identifying recall information associated with the recall of the data;
- calculating a recall duration, based on the recall information; and
- sending the recall duration and the recall information from the first server to the client device via a message buffer of a network file system (NFS) protocol error code.

16. The computer-implemented method of claim 15, wherein it is determined that the data has been migrated in response to identifying that only a stub associated with the data is stored at the first server.

17. The computer-implemented method of claim 15, wherein the recall information includes metadata describing a tier on which the data is located, a type of storage used to store the data at the tier, whether the storage is mounted, and a position of the data within the storage.

18. The computer-implemented method of claim 15, wherein an HSM client on the first server calculates the recall duration, based on a comparison of the recall information to historic recall information associated with historical recall durations.

19. The computer-implemented method of claim 15, wherein the recall duration and the recall information are sent from an NFS server at the first server to and NFS client at the client device, utilizing an updated communications protocol.

20. The computer-implemented method of claim 15, further comprising:
- receiving updated recall information at the first server from the second server during the recall;
- re-calculating the recall duration, based on the updated recall information; and sending the re-calculated recall duration and the updated recall information from the first server to the client device.

\* \* \* \* \*